US008880735B2

(12) United States Patent
Tosey

(10) Patent No.: US 8,880,735 B2
(45) Date of Patent: Nov. 4, 2014

(54) MAIL SERVER BASED APPLICATION RECORD SYNCHRONIZATION

(75) Inventor: Joseph Peter Robert Tosey, North Vancouver (CA)

(73) Assignee: Sierra Wireless, Inc., Richmond, BC (CA)

( * ) Notice: Subject to any disclaimer, the term of this patent is extended or adjusted under 35 U.S.C. 154(b) by 1907 days.

(21) Appl. No.: 10/656,511

(22) Filed: Sep. 5, 2003

(65) Prior Publication Data

US 2005/0055386 A1    Mar. 10, 2005

(51) Int. Cl.
G06F 15/16    (2006.01)
G06F 17/30    (2006.01)
G06Q 10/10    (2012.01)
H04L 12/58    (2006.01)

(52) U.S. Cl.
CPC ........ *G06Q 10/107* (2013.01); *G06F 17/30575* (2013.01); *H04L 51/22* (2013.01)
USPC ....................................... 709/248

(58) Field of Classification Search
None
See application file for complete search history.

(56) References Cited

U.S. PATENT DOCUMENTS

| | | | | |
|---|---|---|---|---|
| 5,647,002 A * | 7/1997 | Brunson | ........................ | 709/206 |
| 5,757,669 A * | 5/1998 | Christie et al. | ................. | 709/205 |
| 6,341,316 B1 * | 1/2002 | Kloba et al. | ................... | 709/248 |
| 6,449,622 B1 * | 9/2002 | LaRue et al. | .................... | 707/201 |
| 6,457,062 B1 * | 9/2002 | Pivowar et al. | ............... | 709/248 |
| 6,636,897 B1 * | 10/2003 | Sherman et al. | .............. | 709/248 |
| 6,708,187 B1 * | 3/2004 | Shanumgam et al. | ........ | 707/201 |
| 6,725,256 B1 * | 4/2004 | Albal et al. | .................... | 709/206 |
| 6,792,085 B1 * | 9/2004 | Rigaldies et al. | .......... | 379/88.13 |
| 6,868,092 B1 * | 3/2005 | Bell et al. | ....................... | 370/503 |
| 6,879,996 B1 * | 4/2005 | Laves | ............................ | 709/206 |
| 6,895,512 B1 * | 5/2005 | Calbucci | ........................... | 726/3 |
| 6,907,450 B1 * | 6/2005 | Lautenbacher | ............... | 709/204 |
| 6,910,052 B2 * | 6/2005 | Gates et al. | .................... | 707/201 |
| 6,983,308 B1 * | 1/2006 | Oberhaus et al. | ............ | 709/206 |
| 7,124,204 B2 * | 10/2006 | Givoly et al. | ................. | 709/248 |
| 7,127,477 B2 * | 10/2006 | Duncombe et al. | ............ | 707/203 |

(Continued)

FOREIGN PATENT DOCUMENTS

CA    2317091 A1    3/2001
GB    2 203 571 A    10/1988

(Continued)

OTHER PUBLICATIONS

International Search Report, PCT/CA2004/001588, dated Nov. 26, 2004.

(Continued)

*Primary Examiner* — Brian P Whipple
(74) *Attorney, Agent, or Firm* — Nixon Peabody LLP

(57) ABSTRACT

A solution is provided wherein standard mail servers may be used to assist the synchronization of application data across multiple devices. This allows the synchronization of application data without requiring contemporaneous operation of the synchronization partner devices. This may be accomplished by generating a record for each change to a database on a first device. Upon synchronization of the first device with the mail server, the changes since the last synchronization may be uploaded to the mail server and stored in a mailbox for a user associated with the device. If a second device associated with the user then attempts to synchronize with the mail server, the records may be downloaded and the corresponding changes implemented in the database on the second device.

62 Claims, 9 Drawing Sheets

(56) References Cited

U.S. PATENT DOCUMENTS

| | | | |
|---|---|---|---|
| 7,149,813 B2* | 12/2006 | Flanagin et al. | 709/248 |
| 7,191,218 B1* | 3/2007 | Innes | 709/206 |
| 7,209,949 B2* | 4/2007 | Mousseau et al. | 709/206 |
| 7,213,039 B2* | 5/2007 | Ramanujam | 707/203 |
| 2001/0044805 A1* | 11/2001 | Multer et al. | 707/201 |
| 2002/0010807 A1* | 1/2002 | Multer et al. | 709/328 |
| 2002/0029227 A1* | 3/2002 | Multer et al. | 707/203 |
| 2002/0065892 A1* | 5/2002 | Malik | 709/206 |
| 2002/0199024 A1* | 12/2002 | Givoly et al. | 709/248 |
| 2003/0046434 A1* | 3/2003 | Flanagin et al. | 709/248 |
| 2004/0024910 A1* | 2/2004 | Marl et al. | 709/248 |

FOREIGN PATENT DOCUMENTS

| | | |
|---|---|---|
| WO | 9905620 A | 2/1999 |
| WO | WO 01/16804 A2 | 3/2001 |
| WO | WO 02/17134 A1 | 2/2002 |

OTHER PUBLICATIONS

Supplementary European Search Report, EP 04 76 1752, mailed Oct. 20, 2009.

\* cited by examiner

MAIL SERVER BASED APPLICATION RECORD SYNCHRONIZATION

FIELD OF THE INVENTION

The present invention relates to the field of personal data management applications. More particularly, the present invention relates to a mail server based system that allows for synchronization of personal data management records.

BACKGROUND OF THE INVENTION

Typical electronic mail (e-mail) systems utilize a mail server, often controlled by the Internet Service Provider (ISP) or other manager of email service, as well as a mail client located on each user's machine. The mail server typically has permanent access to the Internet, as well as other external networks and public data communications networks. The mail server stores and manages user electronic mails. Mail for each authorized user on the system is maintained within an individual storage architecture, commonly known as an inbox. FIG. 1 is a block diagram illustrating this type of design. A mail server 100 connected to a local area network (LAN) 102 may store incoming emails directed to the LAN, while another mail server 104 may operate as part of a public or private wide are network (WAN) 106. The mail server 100 may be periodically polled by desktop mail clients 108a, 108b, portable/handheld mail clients 110, and/or portable computer mail clients 112. A firewall 114 may be connected between the LAN 102 and the WAN 104. Desktop and laptop computers 116a, 116b may be connected to the WAN 104 via dial up 118 or dedicated 120 connections. Additionally, a desktop or laptop computer 122 and/or portable/handheld computing/communications device 124 may connect to the WAN 104 through a wireless connection 126a, 126b.

Personal data management suites have grown in popularity in recent years, buoyed by the increase in the variety of portable devices capable of running such applications. A personal data management suite is a group of application programs that allows users to keep track of personal data, such as appointments, contacts, meeting reminders, task reminders, free form notes, etc.

Due to the wide variety of devices that run personal data management suites, it is not uncommon for users to maintain multiple copies of their personal data management database. A user may have an office desktop computer, a home computer, a laptop computer, a personal data assistant (PDA), and intelligent mobile telephone, etc., all of which could potentially store a copy of the database. Not only are there multiple copies of the database, but there are also multiple sources of changes to the database, as the user could change the database while at work, on the road, via an assistant, or the database could be changed through a workgroup event scheduler.

Multiple copies of the database and multiple sources of changes result in the requirement to periodically synchronize the database among the different copies. However, since the format of these databases and their content is not standardized, each application must provide its own proprietary synchronization process.

Current approaches for synchronization of personal data management databases include direct connection synchronization, and specific application database server synchronization. In direct connection synchronization, the two devices to be synchronized are directly connected. This may be via direct serial data link, Universal serial bus (USB), the Internet, parallel data connection, Infrared serial connection, radio data link, or any other one-to-one data connection. Both synchronizing devices contemporaneously operate with the compatible personal data management application and compatible proprietary synchronization procedures. FIGS. 2A and 2B are diagrams illustrating examples of direct connection synchronization. In FIG. 2A, the devices are located at or about the same physical location. The connection may be, for example, direct serial data link, USB, parallel data connection, etc. In FIG. 2B, the devices are connected through a public or private wide area network, such as the Internet. In both examples, the two devices must be concurrently running compatible database synchronization procedures.

In specific application database server synchronization, all databases are maintained on a proprietary application specific database server. All devices maintain local copies of the database, but perform a proprietary synchronization procedure with the database server. Here again, both the device and the server need to have contemporaneous operation to provide synchronization. FIG. 2C is a diagram illustrating an example of specific application database server synchronization. A master copy of the personal information databases resides on the proprietary database server 200, and each of the devices 202, 204, 206, 208 maintain a local copy of the database information.

However, not all users have the luxury of being able to rely on the availability/accessibility of such a proprietary application server. Instead, a user may only have access to standard electronic mail servers, especially when dealing with handheld-type devices. These electronic mail servers do not support the maintenance of such a centralized master copy of the databases. The electronic mail servers also do not support the proprietary synchronization procedures of these database applications. Additionally, even if the user does have access to a proprietary application server, such a system requires that the server be available 24 hours a day, which may be too much of a burden on the server.

Therefore, users of such personal data management suites must periodically ensure that each device be synchronized with all other devices that also carry the same database information.

Furthermore, there has been an increase in the use of high-powered laptop computers as desktop replacements. While this allows the user to take the laptop and its copy of the personal management database on the move, it also means the user cannot rely on the desktop computer as a permanently reachable device. Thus, it becomes even more difficult for a user to rely on a central accessible copy of the database.

What is needed is a solution that allows for the synchronizing of multiple copies of personal management data without requiring that the different devices that carry the data files be directly connected and without requiring the use of a proprietary application server. What is also needed is a solution that allows synchronization of personal management data without requiring contemporaneous operation of the synchronization partners.

Furthermore, it is sometimes desirable to be able to retrieve and respond to an email without downloading attachments to the email. For example, an email may be sent by a meeting organizer inviting attendees. The email may include attachments having documents pertinent to the meeting topic. An attendee receives the invitation email and responds with an acceptance. On acceptance, the attendee's calendar may automatically be updated with the meeting entry. However, the user may be on a device with little memory or a connection with low bandwidth, and thus may not want, or be able, to download the attachments. What is needed is a solution that allows for the receipt of and response to an email without necessitating the downloading of attachments to the email.

BRIEF DESCRIPTION OF THE INVENTION

A solution is provided wherein standard mail servers may be used to assist the synchronization of application data across multiple devices. This allows the synchronization of application data without requiring contemporaneous operation of the synchronization partner devices. This may be accomplished by generating a record for each change to a database on a first device. Upon synchronization of the first device with the mail server, the changes since the last synchronization may be uploaded to the mail server and stored in a mailbox for a user associated with the device. If a second device associated with the user then attempts to synchronize with the mail server, the records may be downloaded and the corresponding changes implemented in the database on the second device.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
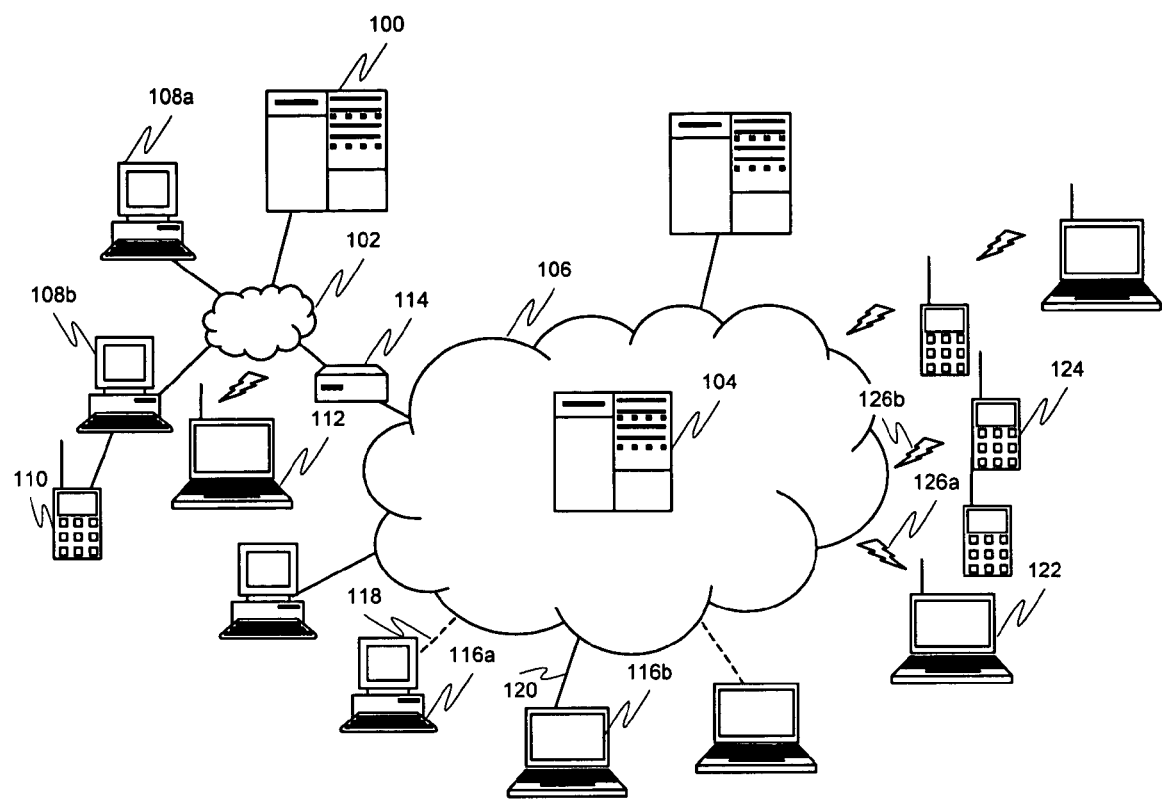
FIG. 1 is a diagram illustrating a typical mail server and client system.
Figure 2A:
FIGS. 2A and 2B are diagrams illustrating examples of direct connection synchronization.
Figure 2B:
Figure 2C:
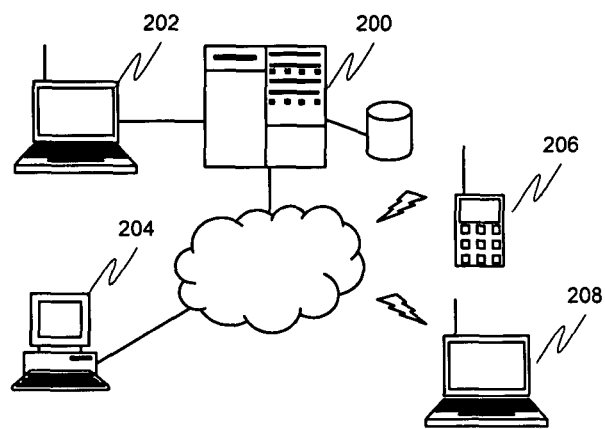
FIG. 2C is a diagram illustrating an example of specific application database server synchronization.

Embodiments of the present invention are described herein in the context of a system of computers, servers, and software.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Additionally, one of ordinary skill in the art will recognize that the invention need not be limited to personal data management information. It may be extended to any database, such as inventory tracking databases, sales databases, etc.

The present invention provides a solution wherein standard mail servers may be used to assist the synchronization of application data across multiple devices. This allows the synchronization of application data without requiring contemporaneous operation of the synchronization partner devices.

In an embodiment of the present invention, an application located on each device may generate a change-action-queue record on each modification of the data file or support generation of a list of change-action-queue records since the last synchronization process. Each change-action-queue record may describe a change made to the database. Therefore, each change-action-queue record may include, for example, the following:

(1) The identity of the device submitting the change-action-queue record.

(2) A time stamp of the submission of the change-action-queue record.

(3) A pseudo-unique identification of the change-action record being reported.

(4) A time stamp of the database record or object change-action event.

(5) The database record or object change-action event.

(6) The location and identity of attachment documents associated with the change-action-queue record (7) Other identification/authentication credentials It should be noted that the time stamp need not be related to a time-based clock. It may simply be a monotonically increasing identifier, for example.

An electronic mail server may then support creation and maintenance of user specified folders and records. The application on each device may send the change-action-queue record to the electronic mail server and have it maintained within a folder specified for the application. Then the "other" device in the synchronization may download any and all change-action-queue record files submitted to the electronic mail server by other devices for its consumption. The data application may use the downloaded change-action-queue records to update its copy of the application database. On retrieval of the change-action-queue record, or upon successful implementation of the change-actions, the application on the device may delete the associated change-action-queue record file from the mail server. This deletion is helpful in clearing the mailbox of extraneous information, though deletion upon any downloading is typically reserved for pair-wise synchronization (between 2 devices only), as such a deletion will prevent subsequent devices from receiving information regarding the change. In implementations with more than 2 devices, therefore, it is best if the information is not deleted until all of the devices have downloaded. This may be accomplished by tracking which devices in a group associated with the user has downloaded, and only deleting once all devices have downloaded.

Additionally, in an embodiment of the present invention, the application on each device may have the capability to direct the mail server to copy attachment documents from a specified email record to a specified location on the email server. This allows a user to accept a meeting invitation (or other notification via email) without downloading attachments to the email. The attachments may be stored in the specified location for later retrieval by the user. This would allow, for example, a user to simply acknowledge the meeting invitation while on a PDA, and download the attachments to the email from a home computer later on.

Figure 3:
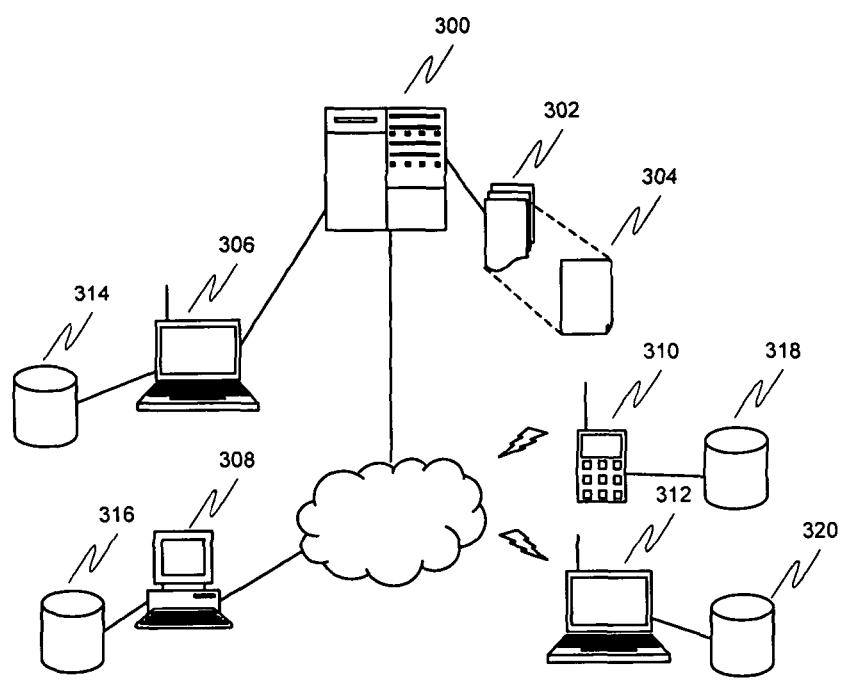
FIG. 3 is a diagram illustrating a system for database synchronization in accordance with an embodiment of the present invention.

FIG. 3 is a diagram illustrating a system for database synchronization in accordance with an embodiment of the present invention. An electronic mail server 300 may support the creation and maintenance of user-specified folders and mail records. These mail servers typically have extremely high availability and very high accessibility. In addition, the store-and-forward nature of data networks helps in avoiding the loss of mail records during short outages of the mail server. Furthermore, since the mail server is typically synchronizing mail records with each device periodically, a loss in availability of the mail server can be easily handled by simply running the synchronization of the database records on the next synchronization of mail records. For example, suppose a user wishes to synchronize a database at time X, but the mail server is unavailable at that time. The user device may automatically then queue the database synchronization for the next mail record synchronization at time Y, rather than requiring that the user manually attempt to synchronize databases again until the server is available.

A mailbox 302 may be maintained by the electronic mail server 300 with one or more user-specified mail folders and records. These folders and records may be specifically identified to contain the database change-action-queue record files. The mailbox may contain one or more database change-action-queue records 304.

One or more computing devices 306, 308, 310, 312 each may contain local copies 314, 316, 318, 320 of the database. They each may employ different methods to connect with the electronic mail server. Each device may submit database change-action-queue records to the specified mail folder 304. Each device may also retrieve the database change-action-queue records from the mail server. Each device may then update the local copy of the database based on the downloaded data. Additionally, each device may notify the mail server to copy attachment documents from the specified email to a specified location on the email server. The devices may employ a variety of conflict resolution procedures. Examples may include source-device override, destination-device override, most-recent-change override, duplicate creation, user intervention, or other acceptable procedures.

Figure 4:
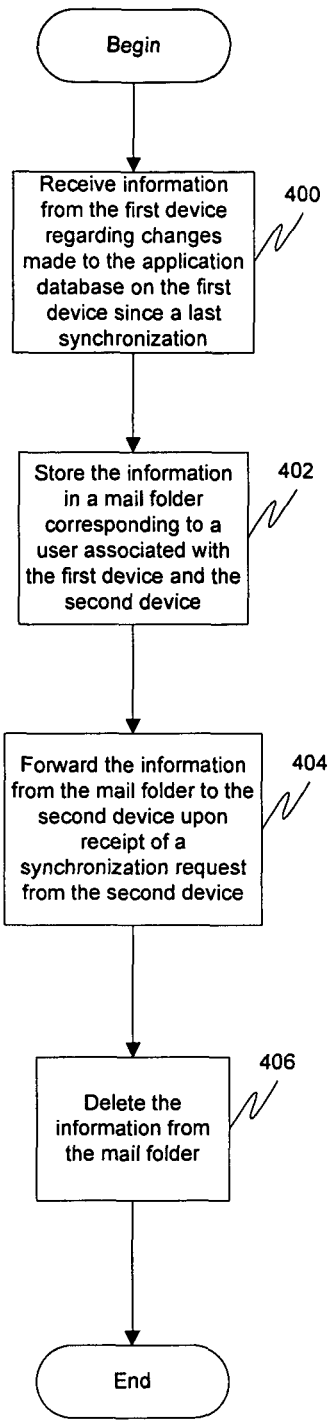
FIG. 4 is a flow diagram illustrating a method for managing the synchronization of an application database located on a first device with an application database located on a second device using a mail server in accordance with an embodiment of the present invention.

FIG. 4 is a flow diagram illustrating a method for managing the synchronization of an application database located on a first device with an application database located on a second device using a mail server in accordance with an embodiment of the present invention. This method may be performed at the mail server. At 400, the mail server may receive information from the first device regarding changes made to the application database on the first device since a last synchronization. The information may include a record for each change made to the application database since the last synchronization. As such, it may include an identification of the device where the change took place, a time stamp indicating the time the record is synchronized with the mail server, an identification of the record, a time stamp indicating the time the corresponding change to the database was made, etc. At 402, the information may be stored in a mail folder corresponding to a user associated with the first device and the second device. At 404, the information may be forwarded from the mail folder to the second device upon receipt of a synchronization request from the second device. At 406, the information may be deleted from the mail folder.

Figure 5:
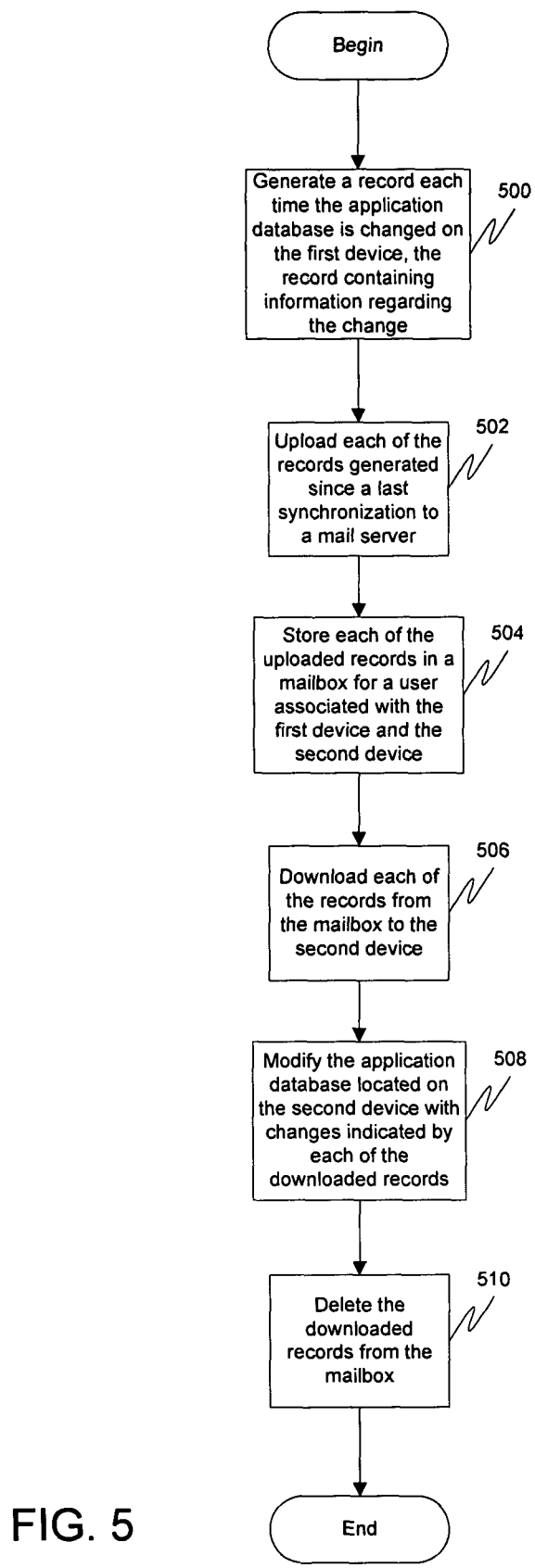
FIG. 5 is a flow diagram illustrating a method for synchronizing an application database located on a first device with an application database located on a second device in accordance with an embodiment of the present invention.

FIG. 5 is a flow diagram illustrating a method for synchronizing an application database located on a first device with an application database located on a second device in accordance with an embodiment of the present invention. At 500, a record may be generated each time the application database is changed on the first device, the record containing information regarding the change. As such, it may include an identification of the device where the change took place, a time stamp indicating the time the record is synchronized with the mail server, an identification of the record, a time stamp indicating the time the corresponding change to the database was made, etc. At 502, each of the records generated since a last synchronization may be uploaded to a mail server. This may occur in response to a request for synchronization on the first device. At 504, each of the uploaded records may be stored in a mailbox for a user associated with the first device and the second device. At 506, each of the records may be downloaded from the mailbox to the second device. This may occur in response to a request for synchronization on the second device. At 508, the application database located on the second device may be modified with changes indicated by each of the downloaded records. At 510, the downloaded records may be deleted from the mailbox.

Figure 6:
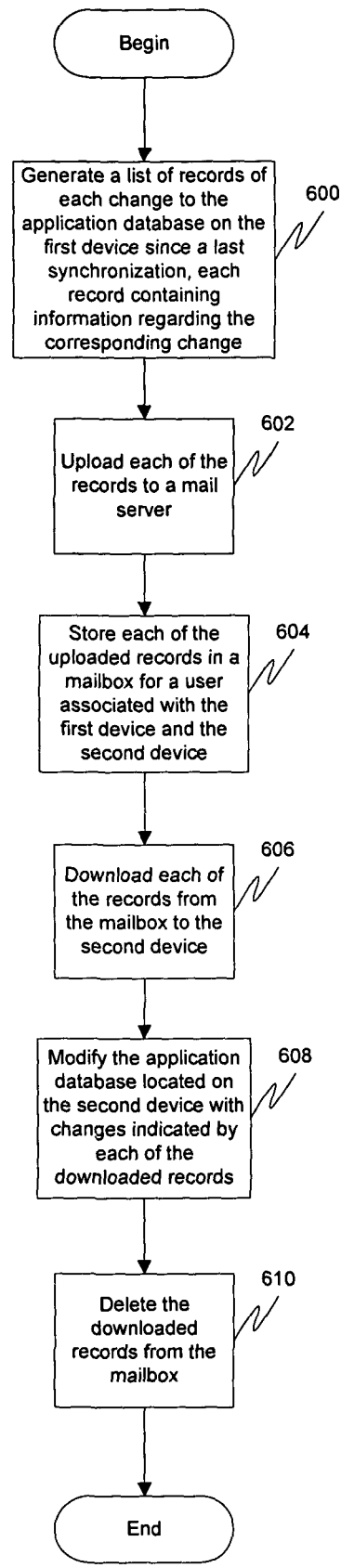
FIG. 6 is a flow diagram illustrating a method for synchronizing an application database located on a first device with an application database located on a second device in accordance with another embodiment of the present invention.

FIG. 6 is a flow diagram illustrating a method for synchronizing an application database located on a first device with an application database located on a second device in accordance with another embodiment of the present invention. At 600, a list of records of each change to the application database on the first device since a last synchronization may be generated, each record containing information regarding the change. As such, it may include an identification of the device where the change took place, a time stamp indicating the time the record is synchronized with the mail server, an identification of the record, a time stamp indicating the time the corresponding change to the database was made, etc. At 602, each of the records may be uploaded to a mail server. This may occur in response to a request for synchronization on the first device. At 604, each of the uploaded records may be stored in a mailbox for a user associated with the first device and the second device. At 606, each of the records may be downloaded from the mailbox to the second device. This may occur in response to a request for synchronization on the second device. At 608, the application database located on the second device may be modified with changes indicated by each of the downloaded records. At 610, the downloaded records may be deleted from the mailbox.

Figure 7:
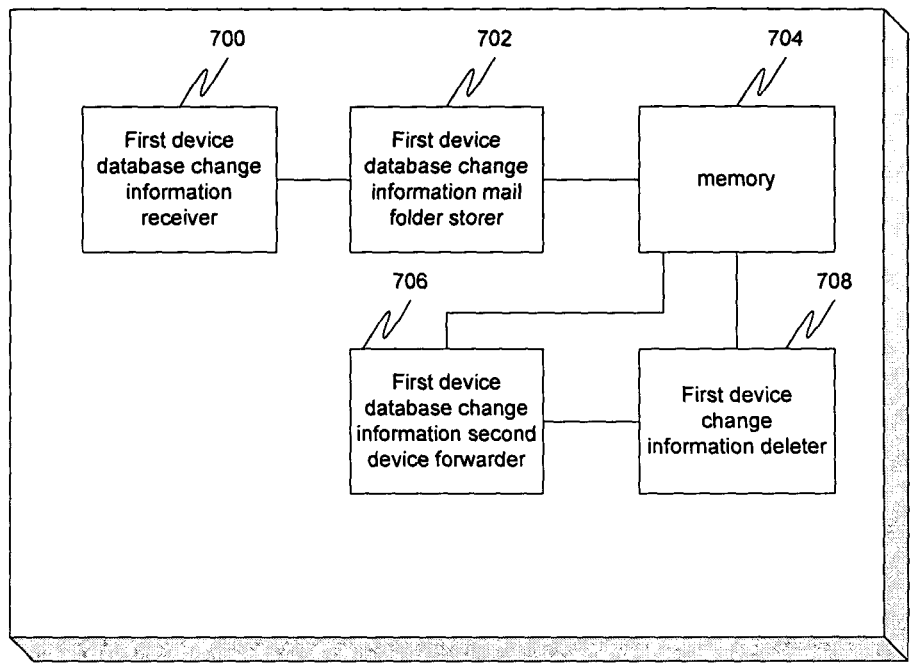
FIG. 7 is a block diagram illustrating an apparatus for managing the synchronization of an application database located on a first device with an application database located on a second device using a mail server in accordance with an embodiment of the present invention.

FIG. 7 is a block diagram illustrating an apparatus for managing the synchronization of an application database located on a first device with an application database located on a second device using a mail server in accordance with an embodiment of the present invention. This may be located at the mail server. A first device database change information receiver 700 may receive information from the first device regarding changes made to the application database on the first device since a last synchronization. The information may include a record for each change made to the application database since the last synchronization. As such, it may include an identification of the device where the change took place, a time stamp indicating the time the record is synchronized with the mail server, an identification of the record, a time stamp indicating the time the corresponding change to the database was made, etc. A first device database change information mail folder storer 702 coupled to the first device database change information receiver 700 and to a memory 704 may store the information in a mail folder in the memory 704 corresponding to a user associated with the first device and the second device. A first device database change information second device forwarder 706 coupled to the memory 704 may forward the information from the mail folder to the second device upon receipt of a synchronization request from the second device. A first device database change information deleter 708 coupled to the first device database change information second device forwarder 706 may delete the information from the mail folder.

Figure 8:
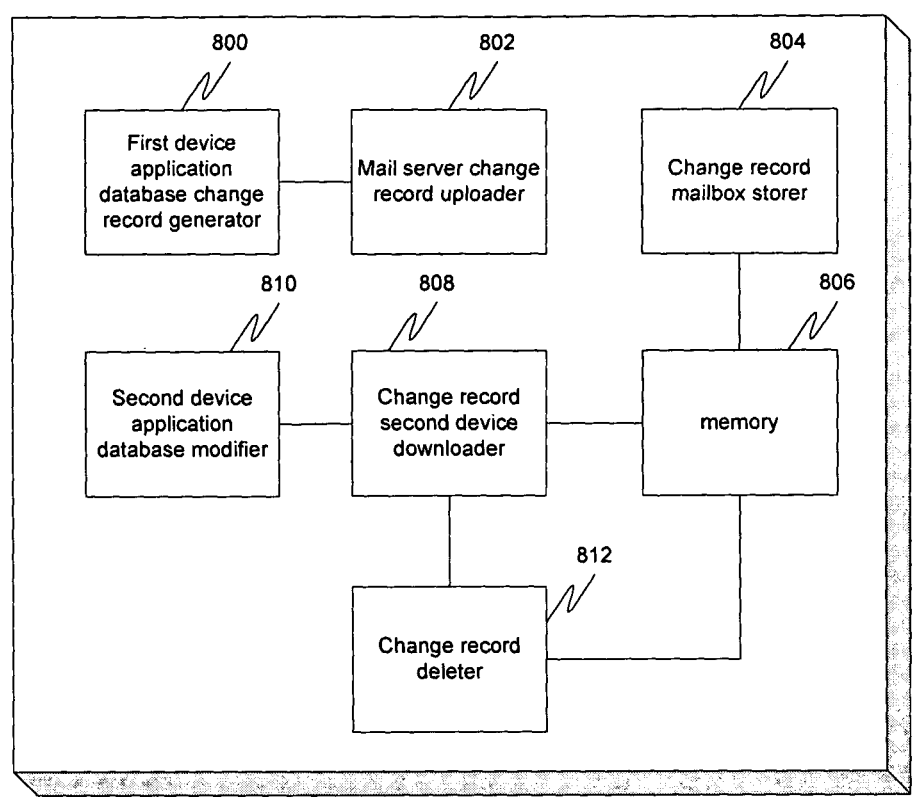
FIG. 8 is a block diagram illustrating an apparatus for synchronizing an application database located on a first device with an application database located on a second device in accordance with an embodiment of the present invention.

FIG. 8 is a block diagram illustrating an apparatus for synchronizing an application database located on a first device with an application database located on a second device in accordance with an embodiment of the present invention. A first device application database change record generator 800 may generate a record each time the application database is changed on the first device, the record containing information regarding the change. As such, it may include an identification of the device where the change took place, a time stamp indicating the time the record is synchronized with the mail server, an identification of the record, a time stamp indicating the time the corresponding change to the database was made, etc. A mail server change record uploader 802 coupled to the first device application database change record generator 800 may upload each of the records generated since a last synchronization to a mail server. This may occur in response to a request for synchronization on the first device. A change record mailbox storer 804 coupled to a memory 806 may store each of the uploaded records in a mailbox for a user associated with the first device and the second device. A change record second device downloader 808 coupled to the memory 806 may download each of the records from the mailbox to the second device. This may occur in response to a request for synchronization on the second device. A second device application database modifier 810 coupled to the change record second device downloader 808 may modify the application database located on the second device with changes indicated by each of the downloaded records. A change record deleter 812 coupled to the change record second device downlaoder 808 and to the memory 806 may delete the downloaded records from the mailbox.

Figure 9:
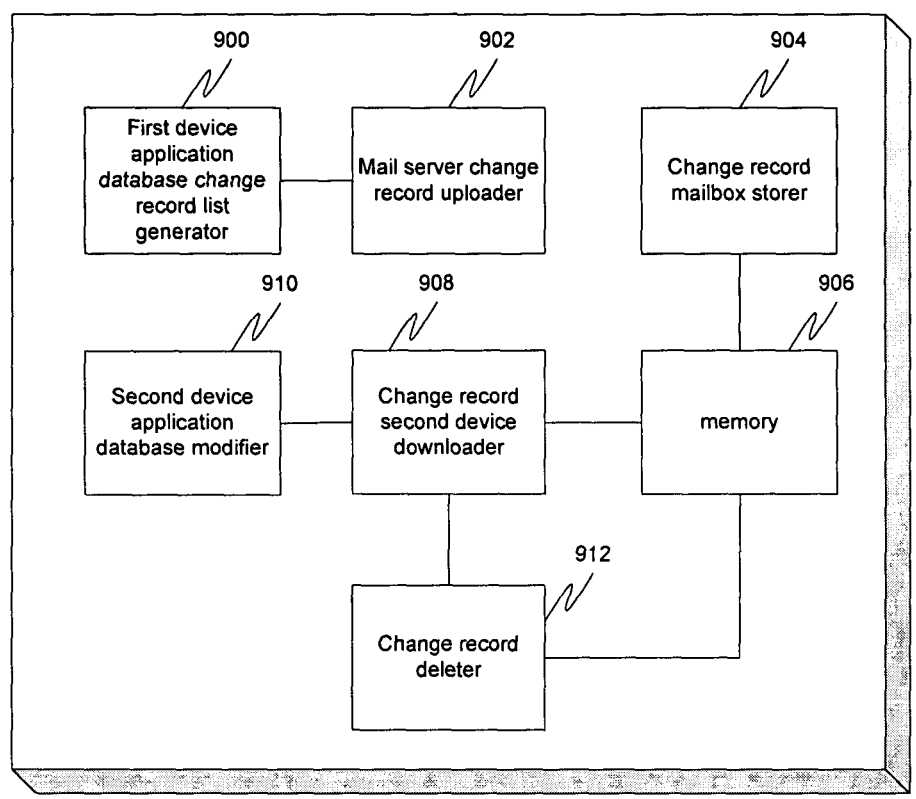
FIG. 9 is a block diagram illustrating an apparatus for synchronizing an application database located on a first device with an application database located on a second device in accordance with another embodiment of the present invention.

FIG. 9 is a block diagram illustrating an apparatus for synchronizing an application database located on a first device with an application database located on a second device in accordance with another embodiment of the present invention. A first device application database change record list generator 900 may generate a list of records of each change to the application database on the first device since a last synchronization, each record containing information regarding the change. As such, it may include an identification of the device where the change took place, a time stamp indicating the time the record is synchronized with the mail server, an identification of the record, a time stamp indicating the time the corresponding change to the database was made, etc. A mail server change record uploader 902 coupled to the first device application database change record list generator 900 may upload each of the record to a mail server. This may occur in response to a request for synchronization on the first device. A change record mailbox storer 904 coupled to a memory 906 may store each of the uploaded records in a mailbox for a user associated with the first device and the second device. A change record second device downloader 908 coupled to the memory 906 may download each of the records from the mailbox to the second device. This may occur in response to a request for synchronization on the second device. A second device application database modifier 910 coupled to the change record second device downloader 908 may modify the application database located on the second device with changes indicated by each of the downloaded records. A change record deleter 912 coupled to the change record second device downlaoder 908 and to the memory 906 may delete the downloaded records from the mailbox.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
   by a mail server, receiving information from a first user computing device regarding every change made to an application database located on the first user computing device;
   by the mail server, storing the information in a mail folder on the mail server, the mail folder corresponding to a user associated with the first user computing device and a second user computing device maintaining a copy of the application database;
   by the mail server, receiving a synchronization request from the second user computing device; and
   responsive to the synchronization request, forwarding, by the mail server, the information from the mail folder to the second user computing device.

2. The method of claim 1, wherein the information includes a record for each change made to the application database since a last synchronization.

3. The method of claim 2, wherein the record for each change includes an identification of the user computing device where the change took place.

4. The method of claim 2, wherein the record for each change includes a time stamp indicating the time the record is synchronized with the mail server.

5. The method of claim 2, wherein the record for each change includes an identification of the record.

6. The method of claim 2, wherein the record for each change includes a time stamp indicating the time the corresponding change to the database was made.

7. The method of claim 2, wherein the record for each change includes a location and identity of attachment documents associated with a change-action-queue record.

8. The method of claim 1, further comprising:
deleting the information from the mail folder after the forwarding.

9. A computer implemented method comprising:
by a first user computing device, generating a record each time an application database located on the first user computing device is changed, the record containing information regarding the change;
by the first user computing device, uploading each of the records generated since a last synchronization to a mail server;
by the mail server, storing each of the records in a mailbox on the mail server, the mailbox for a user associated with the first user computing device and a second user computing device;
by the mail server, receiving a synchronization request from the second user computing device;
responsive to the synchronization request, downloading, by the mail server, each of the records from the mailbox to the second user computing device; and
by the second user computing device, modifying an application database located on the second user computing device with changes indicated by each of the downloaded records.

10. The method of claim 9, wherein the uploading occurs in response to a request for synchronization on the first user computing device.

11. The method of claim 9, wherein the downloading occurs in response to a request for synchronization on the second user computing device.

12. The method of claim 9, wherein the record for each change includes an identification of the user computing device where the change took place.

13. The method of claim 9, wherein the record for each change includes a time stamp indicating the time the record is synchronized with the mail server.

14. The method of claim 9, wherein the record for each change includes an identification of the record.

15. The method of claim 9, wherein the record for each change includes a time stamp indicating the time the corresponding change to the database was made.

16. The method of claim 9, wherein the record for each change includes a location and identity of attachment documents associated with a change-action-queue record.

17. The method of claim 9, further comprising:
deleting the records from the mailbox after the downloading.

18. A computer implemented method comprising:
by a first user computing device, generating a list of records of each change to an application database located on the first user computing device since a last synchronization, each record containing information regarding the corresponding change;
by the first user computing device, uploading each of the records to a mail server;
by the mail server, storing each of the records in a mailbox on the mail server, the mailbox for a user associated with the first user computing device and a second user computing device;
by the mail server, receiving a synchronization request from the second user computing device;
responsive to the synchronization request, downloading, by the mail server, each of the records from the mailbox to the second user computing device; and
by the second user computing device, modifying an application database located on the second user computing device with changes indicated by each of the downloaded records.

19. The method of claim 18, wherein the uploading occurs in response to a request for synchronization on the first user computing device.

20. The method of claim 18, wherein the downloading occurs in response to a request for synchronization on the second user computing device.

21. The method of claim 18, wherein the record for each change includes an identification of the user computing device where the change took place.

22. The method of claim 18, wherein the record for each change includes a time stamp indicating the time the record is synchronized with the mail server.

23. The method of claim 18, wherein the record for each change includes an identification of the record.

24. The method of claim 18, wherein the record for each change includes a time stamp indicating the time the corresponding change to the database was made.

25. The method of claim 18, wherein the record for each change includes a location and identity of attachment documents associated with a change-action-queue record.

26. The method of claim 18, further comprising:
deleting the records from the mailbox after the downloading.

27. An apparatus comprising:
a memory;
a first user computing device database change information receiver configured to receive information from a first user computing device regarding every change made to an application database located on the first user computing device;
a first user computing device database change information mail folder storer coupled to the first user computing device database change information receiver and to the memory and configured to store the information in a mail folder corresponding to a user associated with the first user computing device and a second user computing device, the apparatus further configured to receive a synchronization request from the second user computing device; and
a first user computing device database change information forwarder coupled to the memory and configured to, responsive to the synchronization request, forward the information from the mail folder to the second user computing device, the second user computing device further configured to maintain a copy of the application database.

28. The apparatus of claim 27, further comprising a first device database change information deleter coupled to the first device database change information second device forwarder.

29. An apparatus comprising:
a first device application database change record generator configured to generate a record each time an application database is changed on a first user computing device, the record containing information regarding the change;
a mail server change record uploader coupled to the first device application database change record generator and configured to upload each of the records generated since a last synchronization to a mail server;
a memory;
a change record mailbox storer coupled to the memory and configured to store each of the records in a mailbox on the mail server, the mailbox for a user associated with the first user computing device and a second user computing device, the apparatus further configured to receive a synchronization request from the second user computing device;

a change record second device downloader coupled to the memory and configured to, responsive to the synchronization request, download each of the records from the mailbox to the second user computing device; and a second device application database modifier coupled to the change record second device downloader and configured to modify an application database located on the second user computing device with changes indicated by each of the downloaded records.

30. The apparatus of claim 29, further comprising a change record deleter coupled to the change record second device downloader and to the memory.

31. An apparatus comprising:
a first device application database change record list generator and configured to generate a list of records of each change to an application database located on a first user computing device since a last synchronization, each record containing information regarding the corresponding change;

a mail server change record uploader coupled to the first device application database change record list generator and configured to upload each of the records to a mail server;

a memory;

a change record mailbox storer coupled to the memory and configured to store each of the records in a mailbox on the mail server, the mailbox for a user associated with the first user computing device and a second user computing device, the apparatus further configured to receive a synchronization request from the second user computing device;

a change record second device downloader coupled to the memory and configured to, responsive to the synchronization request, download each of the records from the mailbox to the second user computing device; and a second device application database modifier coupled to the change record second device downloader and configured to modify an application database located on the second user computing device with changes indicated by each of the downloaded records.

32. The apparatus of claim 31, further comprising a change record deleter coupled to the change record second device downloader and to the memory.

33. An apparatus comprising:
means for receiving, by a mail server, information from a first user computing device regarding every change made to an application database located on the first user computing device;

means for storing, by the mail server, the information in a mail folder corresponding to a user associated with the first user computing device and a second user computing device;

means for receiving, by the mail server, a synchronization request from the second user computing device; and means for forwarding, by the mail server, the information from the mail folder to the second user computing device, the second user computing device maintaining a copy of the application database.

34. The apparatus of claim 33, wherein the information includes a record for each change made to the application database since a last synchronization.

35. The apparatus of claim 34, wherein the record for each change includes an identification of the user computing device where the change took place.

36. The apparatus of claim 34, wherein the record for each change includes a time stamp indicating the time the record is synchronized with the mail server.

37. The apparatus of claim 34, wherein the record for each change includes an identification of the record.

38. The apparatus of claim 34, wherein the record for each change includes a time stamp indicating the time the corresponding change to the database was made.

39. The apparatus of claim 34, further comprising:
means for deleting the records from the mailbox after the downloading.

40. The apparatus of claim 33, further comprising:
means for deleting the information from the mail folder after the forwarding.

41. An apparatus comprising:
means for generating, by a first user computing device, a record each time an application database is changed on a first user computing device, the record containing information regarding the change;

means for uploading, by the first user computing device, each of the records generated since a last synchronization to a mail server;

means for storing, by the mail server, each of the records in a mailbox for a user associated with the first user computing device and a second user computing device;

means for receiving, by the mail server, a synchronization request from the second user computing device;

means for, responsive to the synchronization request, downloading, by the mail server, each of the records from the mailbox to the second user computing device; and means for modifying, by the second user computing device, an application database located on the second user computing device with changes indicated by each of the downloaded records.

42. The apparatus of claim 41, wherein the uploading occurs in response to a request for synchronization on the first user computing device.

43. The apparatus of claim 41, wherein the downloading occurs in response to a request for synchronization on the second user computing device.

44. The apparatus of claim 41, wherein the record for each change includes an identification of the user computing device where the change took place.

45. The apparatus of claim 41, wherein the record for each change includes a time stamp indicating the time the record is synchronized with the mail server.

46. The apparatus of claim 41, wherein the record for each change includes an identification of the record.

47. The apparatus of claim 41, wherein the record for each change includes a time stamp indicating the time the corresponding change to the database was made.

48. The apparatus of claim 41, wherein the record for each change includes a location and identity of attachment documents associated with a change-action-queue record.

49. The apparatus of claim 41, further comprising:
means for deleting the records from the mailbox after the downloading.

50. The apparatus of claim 41, further comprising:
means for deleting the records from the mailbox after the downloading.

51. An apparatus comprising:
means for generating, by a first user computing device, a list of records of each change to an application database located on the first user computing device since a last synchronization, each record containing information regarding the corresponding change;

means for uploading, by the first user computing device, each of the records to a mail server;

means for storing, by the mail server, each of the records in a mailbox for a user associated with the first user computing device and a second user computing device;

means for, by the mail server, receiving a synchronization request from the second user computing device;

means for, responsive to the synchronization request, downloading, by the mail server, each of the records from the mailbox to the second user computing device; and means for, by the second user computing device, modifying an application database located on the second user computing device with changes indicated by each of the downloaded records.

52. The apparatus of claim 51, wherein the uploading occurs in response to a request for synchronization on the first user computing device.

53. The apparatus of claim 51, wherein the downloading occurs in response to a request for synchronization on the second user computing device.

54. The apparatus of claim 51, wherein the record for each change includes an identification of the user computing device where the change took place.

55. The apparatus of claim 51, wherein the record for each change includes a time stamp indicating the time the record is synchronized with the mail server.

56. The apparatus of claim 51, wherein the record for each change includes an identification of the record.

57. The apparatus of claim 51, wherein the record for each change includes a time stamp indicating the time the corresponding change to the database was made.

58. The apparatus of claim 51, wherein the record for each change includes a location and identity of attachment documents associated with a change-action-queue record.

59. The apparatus of claim 51, further comprising:
means for deleting the records from the mailbox after the downloading.

60. A program storage device readable by a machine, tangibly embodying a program of instructions executable by the machine to perform a method, the method comprising:

by a mail server, receiving information from a first user computing device regarding every change made to an application database located on the first user computing device;

by the mail server, storing the information in a mail folder on the mail server, the mail folder corresponding to a user associated with the first user computing device and a second user computing device maintaining a copy of the application database;

by the mail server, receiving a synchronization request from the second user computing device and responsive to the synchronization request, forwarding, by the mail server, the information from the mail folder to the second user computing device.

61. A program storage device readable by a machine, tangibly embodying a program of instructions executable by the machine to perform a method, the method comprising:

by a first user computing device, generating a record each time an application database located on the first user computing device is changed, the record containing information regarding the change;

by the first user computing device, uploading each of the records generated since a last synchronization to a mail server;

by the mail server, storing each of the records in a mailbox on the mail server, the mailbox for a user associated with the first user computing device and a second user computing device;

by the mail server, receiving a synchronization request from the second user computing device;

responsive to the synchronization request, downloading, by the mail server, each of the records from the mailbox to the second user computing device; and by the second user computing device, modifying an application database located on the second user computing device with changes indicated by each of the downloaded records.

62. A program storage device readable by a machine, tangibly embodying a program of instructions executable by the machine to perform a method, the method comprising:

by a first user computing device, generating a list of records of each change to an application database located on the first user computing device since a last synchronization, each record containing information regarding the corresponding change;

by the first user computing device, uploading each of the records to a mail server;

by the mail server, storing each of the records in a mailbox on the mail server, the mailbox for a user associated with the first user computing device and a second user computing device;

by the mail server, receiving a synchronization request from the second user computing device;

responsive to the synchronization request, downloading, by the mail server, each of the records from the mailbox to the second user computing device; and by the second user computing device, modifying an application database located on the second user computing device with changes indicated by each of the downloaded records.

* * * * *